United States Patent
Dular

Patent Number: 6,083,307
Date of Patent: Jul. 4, 2000

[54] WATER FILTER KIT FOR DRYWALL DUST CONTROL

[76] Inventor: John A. Dular, 354 E. 241st St., Euclid, Ohio 44123-1444

[21] Appl. No.: 09/116,983

[22] Filed: Jul. 16, 1998

[51] Int. Cl.[7] .................................................. B01D 47/02
[52] U.S. Cl. ........................ 96/279; 15/353; 55/DIG. 3; 96/342; 96/353
[58] Field of Search ............................... 95/226; 96/329, 96/340, 342, 344, 351, 353, 355, 279; 55/DIG. 3; 15/353

[56] References Cited

U.S. PATENT DOCUMENTS

| | | | |
|---|---|---|---|
| 996,991 | 7/1911 | Little | 96/353 |
| 2,250,226 | 7/1941 | Juelson | 96/342 |
| 2,609,190 | 9/1952 | Jackson | 96/351 |
| 4,463,474 | 8/1984 | Jacobs | 95/226 |
| 4,678,485 | 7/1987 | Finley et al. | 96/344 |
| 4,818,259 | 4/1989 | Marano | 96/342 |
| 4,874,404 | 10/1989 | Boswell | 95/226 |
| 4,906,261 | 3/1990 | Mohajer | 96/351 |
| 4,939,809 | 7/1990 | Park | 96/351 |
| 5,192,344 | 3/1993 | House | 96/342 |
| 5,428,865 | 7/1995 | Yarbrough | 15/353 |
| 5,858,072 | 1/1999 | Motoda | 95/226 |
| 5,871,562 | 2/1999 | Culoso | 96/329 |
| 5,873,930 | 2/1999 | Sanchez | 55/DIG. 3 |

OTHER PUBLICATIONS

A copy of "Sand & Kleen" label with owners manual describing "Dustless dry wall sanding system" from Magna Industries, Inc. 220 W. 110th Street, Cleveland, OH 44107, including 5 pages, no date.

*Primary Examiner*—Duane S. Smith

[57] ABSTRACT

A new water filter kit for drywall dust control for capturing and controlling dust generated from sanding drywall joint compound. The inventive device includes a container. A lid portion secures to the open upper end of the container. The lid has a pair of apertures therethrough. A filtering tube is secured to one of the apertures of the lid portion and extending interiorly of the container.

5 Claims, 2 Drawing Sheets

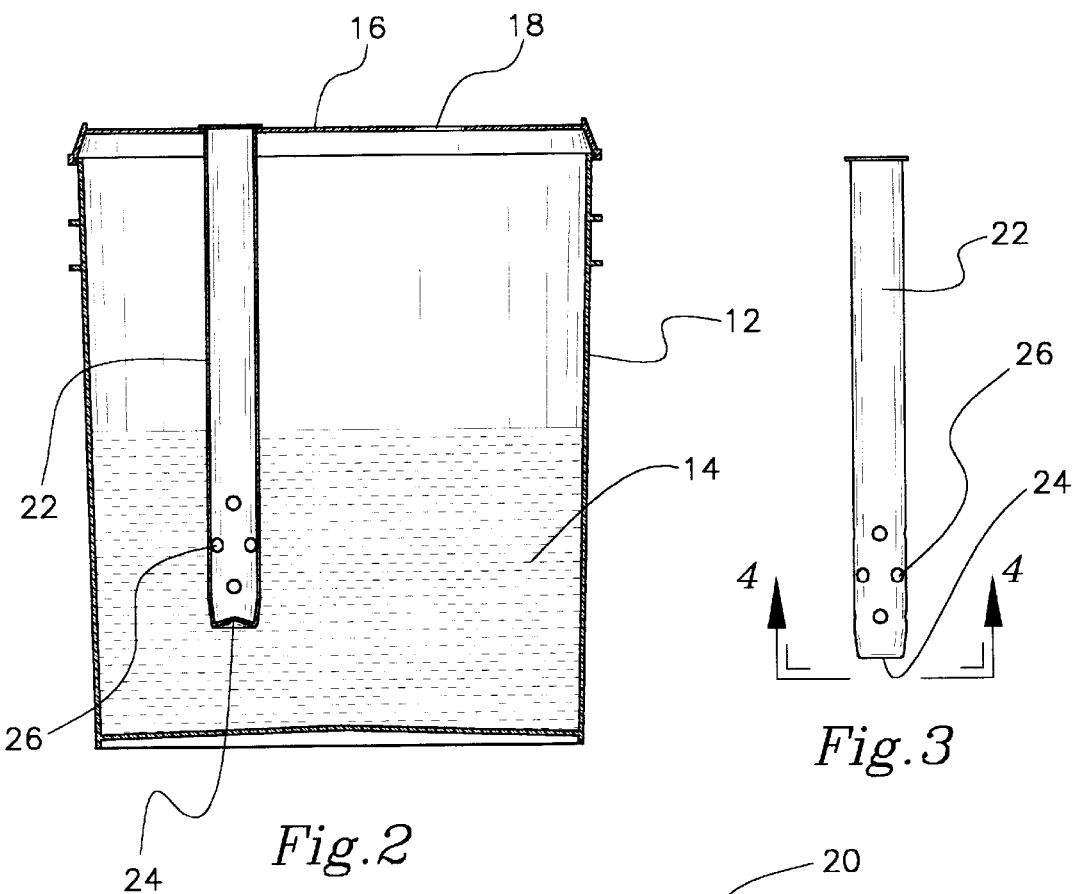
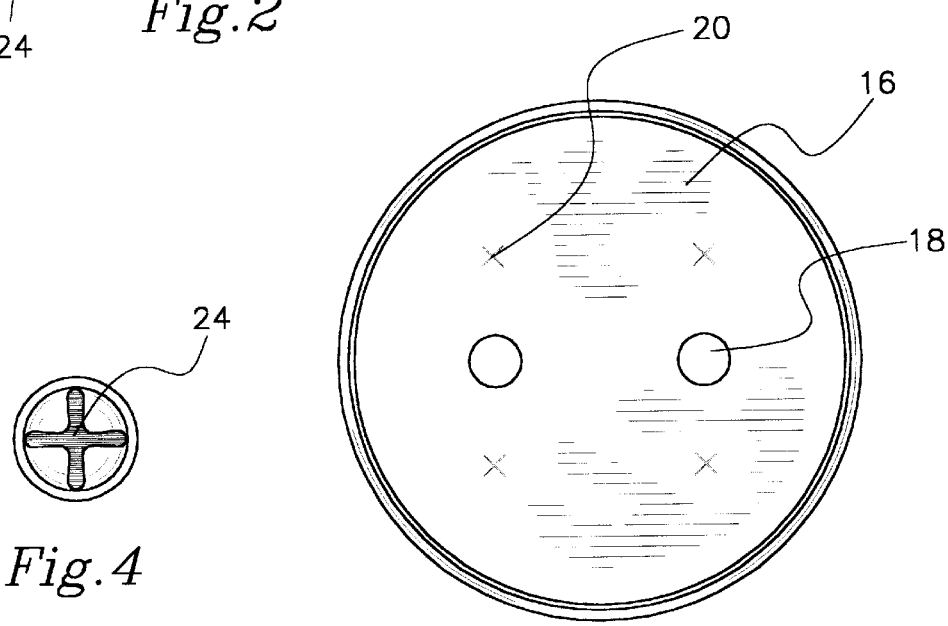

WATER FILTER KIT FOR DRYWALL DUST CONTROL

BACKGROUND OF THE INVENTION

1. Field of the Invention

The present invention relates to water and dust collectors and more particularly pertains to a new water filter kit for drywall dust control for capturing and controlling dust generated from sanding drywall joint compound.

2. Description of the Prior Art

The use of water and dust collectors is known in the prior art. More specifically, water and dust collectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art water and dust collectors include U.S. Pat. No. 5,428,865 to Yarbrough; U.S. Pat. No. 5,660,240 to Harms et al.; U.S. Pat. No. 4,678,485 to Finley et al.; U.S. Pat. No. 4,851,016 to Rylander; U.S. Pat. No. Des. 353,313 to Stiles; and U.S. Pat. No. 3,426,381 to Segesman.

While these devices fulfill their respective, particular objectives and requirements, the aforementioned patents do not disclose a new water filter kit for drywall dust control. The inventive device includes a container. A lid portion secures to the open upper end of the container. The lid has a pair of apertures therethrough. A filtering tube is secured to one of the apertures of the lid portion and extending interiorly of the container.

In these respects, the water filter kit for drywall dust control according to the present invention substantially departs from the conventional concepts and designs of the prior art, and in so doing provides an apparatus primarily developed for the purpose of capturing and controlling dust generated from sanding drywall joint compound.

SUMMARY OF THE INVENTION

In view of the foregoing disadvantages inherent in the known types of water and dust collectors now present in the prior art, the present invention provides a new water filter kit for drywall dust control construction wherein the same can be utilized for capturing and controlling dust generated from sanding drywall joint compound.

The general purpose of the present invention, which will be described subsequently in greater detail, is to provide a new water filter kit for drywall dust control apparatus and method which has many of the advantages of the water and dust collectors mentioned heretofore and many novel features that result in a new water filter kit for drywall dust control which is not anticipated, rendered obvious, suggested, or even implied by any of the prior art water and dust collectors, either alone or in any combination thereof.

To attain this, the present invention generally comprises a container having a cylindrical configuration. The container has an open upper end, a closed lower end, and a cylindrical side wall therebetween. The container holds a predetermined quantity of water therein. A lid portion secures to the open upper end of the container. The lid has a pair of apertures therethrough. The lid has a plurality of slots therethrough. A filtering tube is secured to one of the apertures of the lid portion and extending interiorly of the container. The filtering tube has an open upper end coupling with the aperture and a crimped open lower end. The filtering tube has a plurality of apertures therethrough upwardly of the open lower end thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water filter kit for drywall dust control apparatus and method which has many of the advantages of the water and dust collectors mentioned heretofore and many novel features that result in a new water filter kit for drywall dust control which is not anticipated, rendered obvious, suggested, or even implied by any of the prior art water and dust collectors, either alone or in any combination thereof.

It is another object of the present invention to provide a new water filter kit for drywall dust control which may be easily and efficiently manufactured and marketed.

It is a further object of the present invention to provide a new water filter kit for drywall dust control which is of a durable and reliable construction.

An even further object of the present invention is to provide a new water filter kit for drywall dust control which is susceptible of a low cost of manufacture with regard to both materials and labor, and which accordingly is then susceptible of low prices of sale to the consuming public, thereby making such water filter kit for drywall dust control economically available to the buying public.

Still yet another object of the present invention is to provide a new water filter kit for drywall dust control which provides in the apparatuses and methods of the prior art some of the advantages thereof, while simultaneously overcoming some of the disadvantages normally associated therewith.

Still another object of the present invention is to provide a new water filter kit for drywall dust control for capturing and controlling dust generated from sanding drywall joint compound.

Yet another object of the present invention is to provide a new water filter kit for drywall dust control which includes a container. A lid portion secures to the open upper end of the container. The lid has a pair of apertures therethrough. A filtering tube is secured to one of the apertures of the lid portion and extending interiorly of the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention illustrated in cross-section.

FIG. 3 is a side view of the filter tube of the present invention.

FIG. 4 is a bottom view of the filter tube of the present invention as taken along line 4—4 of FIG. 3.

FIG. 5 is a top plan view of the lid of the present invention.

DESCRIPTION OF THE PREFERRED EMBODIMENT

Figure 1:
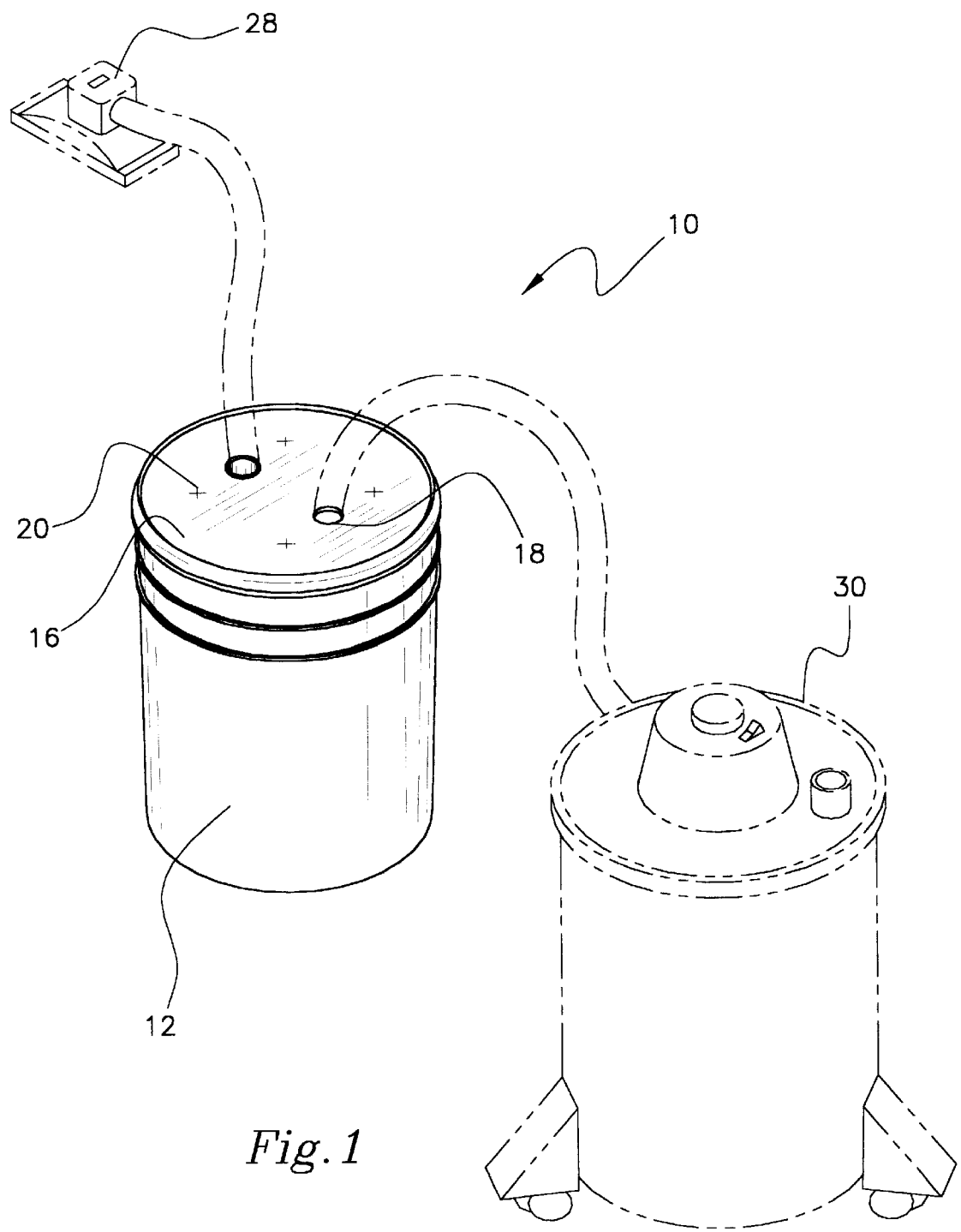
FIG. 1 is a perspective view of a new water filter kit for drywall dust control according to the present invention illustrated in use.

With reference now to the drawings, and in particular to FIGS. 1 through 5 thereof, a new water filter kit for drywall dust control embodying the principles and concepts of the present invention and generally designated by the reference numeral 10 will be described.

As best illustrated in FIGS. 1 through 5, the water filter kit for drywall dust control 10 comprises a container 12 having a cylindrical configuration. The container 12 has an open upper end, a closed lower end, and a cylindrical side wall therebetween. The container 12 holds a predetermined quantity of water 14 therein.

A lid portion 16 secures to the open upper end of the container 12. The lid portion 16 has a pair of apertures 18 therethrough. The lid portion 16 has a plurality of slots 20 therethrough.

A filtering tube 22 is secured to one of the apertures 18 of the lid portion 16 and extending interiorly of the container 12. The filtering tube 22 has an open upper end coupling with the aperture 20 and a crimped open lower end 24. The filtering tube 22 has a plurality of apertures 26 therethrough upwardly of the open lower end 24 thereof. The open lower end 24 is crimped to restrict air flow.

In use, the present invention would be used for both controlling and capturing the dust generated from sanding drywall joint compound. The present invention would be used in conjunction with a standard sander 28 (with vacuum hose attachment) and a standard shop vacuum 30. The container 12 would be filled with water 14 to its half-way point. A hose from the sander 28 would then be connected to the aperture 18 of the lid portion 16 that has the filtering tube 22 extending inwardly therefrom. A hose from the shop vacuum 30 would be connected to the other aperture 18 in the lid portion 16. During the sanding operation, the air and dust from the sander 28 would be drawn down into the water 14, where the dust would be filtered out and contained in the water 14 while the air would continue on to the vacuum source.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new water filter kit for drywall dust control for capturing and controlling dust generated from sanding drywall joint compound comprising, in combination:

a container having a cylindrical configuration, the container having an open upper end, a closed lower end, and a cylindrical side wall therebetween, the container holding a predetermined quantity of water therein;

a lid portion securing to the open upper end of the container, the lid portion having a pair of apertures therethrough, the lid portion having a plurality of slots therethrough;

a filtering tube secured to one of the apertures of the lid portion and extending interiorly of the container, the filtering tube having an open upper end coupling with the aperture and a crimped open lower end, the filtering tube having a plurality of apertures therethrough upwardly of the open lower end thereof.

2. A new water filter kit for drywall dust control for capturing and controlling dust generated from sanding drywall joint compound comprising, in combination:

a container;

a lid portion securing to the open upper end of the container, the lid portion having a pair of apertures therethrough, the lid portion having a plurality of slots therethrough;

a filtering tube secured to one of the apertures of the lid portion and extending interiorly of the container.

3. The water filter kit for drywall dust control as set forth in claim 2 wherein the container has a cylindrical configuration, the container having an open upper end, a closed lower end, and a cylindrical side wall therebetween, the container holding a predetermined quantity of water therein.

4. The water filter kit for drywall dust control as set forth in claim 2 wherein the filtering tube has an open upper end coupling with the aperture and a crimped open lower end.

5. The water filter kit for drywall dust control as set forth in claim 2 wherein the filtering tube has a plurality of apertures therethrough.

* * * * *